UNITED STATES PATENT OFFICE.

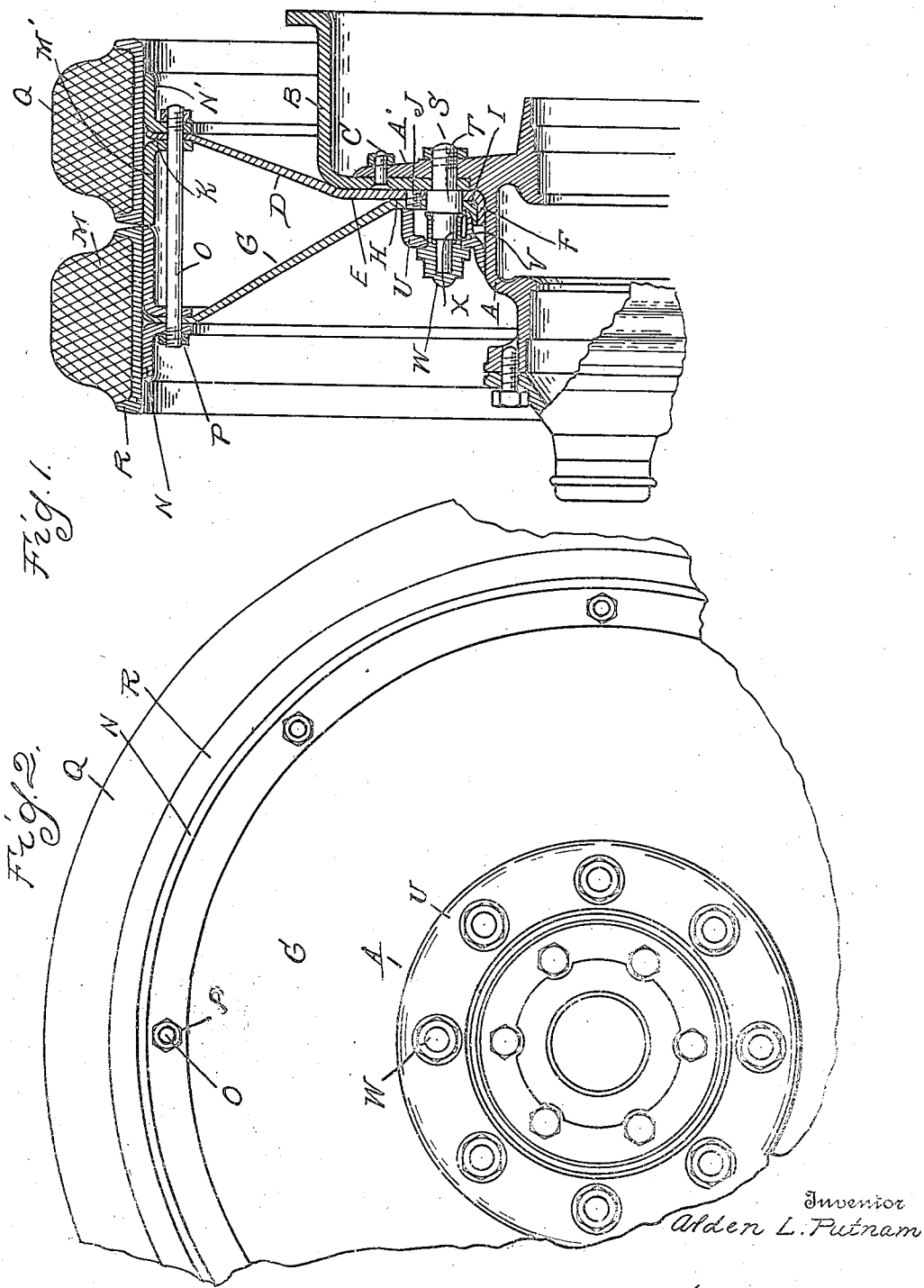

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE WHEEL.

1,402,443.  Specification of Letters Patent.  Patented Jan. 3, 1922.

Application filed September 7, 1917. Serial No. 190,261.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels designed for heavy service, such as on trucks, and it is the object of the invention to facilitate replacement.

In the present state of the art, it is common to provide lighter vehicles, such as pleasure cars, with demountable rims or demountable wheels, permitting of quick exchange. On the other hand, with heavy vehicles, which are usually provided with solid tires, demountable rims or demountable wheels are seldom, if ever, used. Nevertheless there are occasions when the wheel becomes inoperative and requires either replacement or repair. With my invention I have provided a construction which facilitates quick replacement and which comprises essentially twin demountable wheels capable of being mounted or detached as a unit. A further feature of the invention is the forming of these twin wheels with dished disk bodies having a cross-section tapering from the point of attachment to the hub to the point of attachment to the rim. One of these disks is arranged to cross the central plane of impact of the wheel, while the other disk is oppositely dished to form a brace for the overhanging portion of the rim. At the hub the disks have parallel portions which are secured to each other and are generally clamped to the hub flange, the detailed construction being as follows:

In the drawings:

Figure 1 is a section through the wheel;

Figure 2 is a side-elevation through a segment of the wheel.

A is the hub of a vehicle wheel, A′ is the flange thereof and B is the brake-flange secured to said flange by suitable means, such as the bolts C. D is a dished disk having a portion E which lies parallel to the flange A′, said disk being apertured to fit over the hub and having a cylindrical flange F forming a bearing thereon. G is a second disk having a portion H fitting against the portion E and a flange portion I which fits about the flange portion F. The portions H and E are preferably secured to each other by suitable means, such as the threaded studs J. Each disk is also preferably formed of metal of tapering cross-section, being of greatest gauge at the center and diminishing towards the periphery. At the periphery is a portion K preferably lying parallel to the portions E and H and to which the rim sections are secured. These rim sections are formed in pairs which are respectively secured to the disks D and G. The sections M and M′ are arranged on opposite sides of the center of the wheel and between the portions K of the two disks, while the sections N and N′ are arranged outside of the disk. All of these sections are secured in position, preferably by clamping-bolts O, which pass through the flanges of the sections M M′ N and N′ and the portions K of the disks G and D, while at the outer ends of said bolts are the clamping nuts P. Thus when the nuts are tightened, the sections M and M′ are clamped against each other and the sections N and N′ and disks G and D are clamped, the sections N and N′ forming a rigidly braced structure. The tires Q are mounted on the rims in any suitable manner, preferably by providing each with a band R which is pressed upon the rim sections.

For demountably supporting the wheel from the hub studs S are secured to the flange A′, each of said studs having a portion T for engaging a corresponding aperture in the portions H and E of the disks G and D. U is a clamping ring for bearing against the outer face of the portion H, being preferably provided with the wedge portion V for engaging a cooperating wedge portion on the flange I. W is a clamping nut for engaging the threaded outer end of the stud S, said nut being preferably provided with an extension sleeve X which telescopically engages the stud and the aperture in the ring U so as to permit of separately unscrewing.

With the construction described the several parts of the wheel can be readily formed of pressed sheet-metal and easily assembled in relation to each other. The complete structure is one possessing a high degree of strength and rigidity while the weight is relatively small.

What I claim as my invention is:

1. A vehicle wheel, comprising a pair of dished disks having their central portions lying adjacent to each other and their peripheral portions flaring oppositely, a rim formed of a plurality of sections secured to said disks, a pair of said sections being arranged between said disks and abutting against each other, a pair of sections arranged outside of said disks, and clamping bolts passing through said sections and disks and securing the same to each other.

2. A vehicle wheel, comprising a pair of dished disks of tapering cross-section, the central portions of said disks lying in parallel adjacent planes and being secured to each other, the peripheral portions lying in parallel planes and flaring portions arranged intermediate said central and peripheral portions, a rim formed of a plurality of sections secured to said disks, a pair of said sections being arranged between said disks, a pair arranged on opposite sides of said disks, clamping bolts passing through said sections and disks for securing the same to each other, and means for demountably securing the central portions of said disks to the axle hub.

3. A vehicle wheel, comprising a dished disk of tapering cross-section having its central portion arranged on one side of the plane of impact of said disk and its peripheral portion arranged on the opposite side thereof, a second oppositely-dished disk having its central portion lying adjacent to the first-mentioned disk and its peripheral portion spaced therefrom, a rim formed of a plurality of sections, a pair of said sections being arranged between the peripheries of said dished disks, a cooperating pair being arranged outside of said disks, each of said sections having an inwardly-extending flange lying adjacent to one of said disks, and clamping bolts extending through the flanges of said sections and the peripheral portions of said disks for securing the same to each other.

4. A vehicle wheel comprising bodies having their central portions in proximity and diverged outwardly from said portions, a rim formed of a plurality of sections, a pair of said sections being arranged between the peripheries of said bodies, a cooperating pair being arranged outside of said bodies, each of said sections having an inwardly extending flange lying adjacent to one of said bodies, and clamping bolts extended through the flanges of said sections and the peripheral portions of said bodies for securing the same to each other.

5. A vehicle wheel comprising a hub, a pair of dished disks mounted upon said hub and demountable therefrom as a unit having their inner portions lying adjacent to each other and their peripheral portions flaring oppositely, a rim comprising a flanged section between the disks and flanged sections outside of the disks, and clamping bolts extending through the flanges of said sections and through the peripheral portions of the disks for securing the same to each other.

In testimony whereof I affix my signature.

ALDEN L. PUTNAM.